US012759317B2

(12) United States Patent
Tsugimura et al.

(10) Patent No.: US 12,759,317 B2
(45) Date of Patent: Oct. 13, 2026

(54) IMAGE FORMING APPARATUS, COMPUTER-READABLE STORAGE MEDIUM, AND METHOD FOR SELECTING BORDERED PRINTING OR BORDERLESS PRINTING

(71) Applicant: BROTHER KOGYO KABUSHIKI KAISHA, Nagoya (JP)

(72) Inventors: Koichi Tsugimura, Nagoya (JP); Masashi Ohhashi, Kasugai (JP); Satoru Arakane, Nagoya (JP); Haruka Azechi, Nagoya (JP); Yasuhiro Nakano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 214 days.

(21) Appl. No.: 18/494,465

(22) Filed: Oct. 25, 2023

(65) Prior Publication Data

US 2024/0174004 A1 May 30, 2024

(30) Foreign Application Priority Data

Nov. 30, 2022 (JP) ................................ 2022-191183

(51) Int. Cl.
*B41J 11/00* (2006.01)
*B41J 11/66* (2006.01)

(52) U.S. Cl.
CPC .......... *B41J 11/0065* (2013.01); *B41J 11/007* (2013.01); *B41J 11/008* (2013.01); *B41J 11/663* (2013.01)

(58) Field of Classification Search
CPC ............................ B41J 11/0065; B41J 11/008
See application file for complete search history.

(56) References Cited

U.S. PATENT DOCUMENTS

2006/0221369 A1* 10/2006 Inoue ...................... G06F 3/126 358/1.18

FOREIGN PATENT DOCUMENTS

JP 2006-244240 A 9/2006
JP 2010-165005 A 7/2010

* cited by examiner

*Primary Examiner* — Scott A Richmond
(74) *Attorney, Agent, or Firm* — Baker Botts L.L.P.

(57) ABSTRACT

An image forming apparatus includes an image forming engine configured to form on an image formation medium an image represented by image data, by a borderless image forming operation or a bordered image forming operation. The image forming apparatus further includes a controller configured to, when the image data does not contain data explicitly indicating which of the borderless image forming operation and the bordered image forming operation is to be performed, select one of the borderless image forming operation and the bordered image forming operation, based on a status of the image forming apparatus or a content of the image data, or based on the status of the image forming apparatus and the content of the image data, and cause the image forming engine to perform the selected one of the borderless image forming operation and the bordered image forming operation.

6 Claims, 10 Drawing Sheets

IMAGE FORMING APPARATUS, COMPUTER-READABLE STORAGE MEDIUM, AND METHOD FOR SELECTING BORDERED PRINTING OR BORDERLESS PRINTING

REFERENCE TO RELATED APPLICATIONS

This application claims priority from Japanese Patent Application No. 2022-191183 filed on Nov. 30, 2022. The entire content of the priority application is incorporated herein by reference.

BACKGROUND ART

Heretofore, a technology has been known in which an image forming apparatus forms on a medium an image represented by image data obtained externally. In such an image forming apparatus, for instance, it may be possible to make a selection between so-called "bordered printing" in which an image is formed with margins at a periphery portion of the medium, and "borderless printing" in which the image is formed over an entire area of the medium with no margin formed. In the known technology, whether the borderless printing is to be performed is settable by a function of a printer driver on an external device such as a PC.

DESCRIPTION

In recent years, as image forming apparatuses are used in a variety of environments, a situation is anticipatable in which each image forming apparatus obtains image data from various types of printer drivers and applications. Under such circumstances, there may be, as image data to be obtained by each image forming apparatus, data that does not explicitly indicate which of the bordered printing and the borderless printing is to be performed, as well as data explicitly indicating it. If an image forming apparatus is employed that is configured to uniformly select a particular one of the bordered printing and the borderless printing when the obtained image data does not explicitly indicate which of the bordered printing and the borderless printing is to be performed, there is a risk of frequently occurring cases where an image unintended by the user has been formed.

Aspects of the present disclosure are advantageous for providing one or more improved techniques for an image forming apparatus that facilitate image formation in accordance with the user's intention even when image data does not explicitly indicate which of the bordered printing and the borderless printing is to be performed.

According to aspects of the present disclosure, an image forming apparatus is provided, which includes an image forming engine and a controller. The image forming engine is configured to form on an image formation medium an image represented by image data externally obtained, by a borderless image forming operation or a bordered image forming operation. The borderless image forming operation is an operation to form the image over an entire image forming target area on the image formation medium. The bordered image forming operation is an operation to form the image on the image formation medium with a margin formed at a periphery portion of the image forming target area. The controller is configured to, when the image data does not contain data that explicitly indicates which of the borderless image forming operation and the bordered image forming operation is to be performed, select one of the borderless image forming operation and the bordered image forming operation, based on a status of the image forming apparatus or a content of the image data, or based on the status of the image forming apparatus and the content of the image data. The controller is further configured to cause the image forming engine to perform the selected one of the borderless image forming operation and the bordered image forming operation.

According to aspects of the present disclosure, further provided is a non-transitory computer-readable storage medium storing computer-readable instructions that are executable by a processor of an image forming apparatus. The image forming apparatus includes an image forming engine configured to form on an image formation medium an image represented by image data externally obtained. The instructions are configured to, when executed by the processor, cause the image forming apparatus to, when the image data does not contain data that explicitly indicates which of a borderless image forming operation and a bordered image forming operation is to be performed, select one of the borderless image forming operation and the bordered image forming operation, based on a status of the image forming apparatus or a content of the image data, or based on the status of the image forming apparatus and the content of the image data. The borderless image forming operation is an operation to form the image over an entire image forming target area on the image formation medium. The bordered image forming operation is an operation to form the image on the image formation medium with a margin formed at a periphery portion of the image forming target area. The instructions are further configured to, when executed by the processor, cause the image forming apparatus to cause the image forming engine to perform the selected one of the borderless image forming operation and the bordered image forming operation.

According to aspects of the present disclosure, further provided is a method implementable on a processor of an image forming apparatus. The image forming apparatus includes an image forming engine configured to form on an image formation medium an image represented by image data externally obtained. The method includes selecting, when the image data does not contain data that explicitly indicates which of a borderless image forming operation and a bordered image forming operation is to be performed, one of the borderless image forming operation and the bordered image forming operation, based on a status of the image forming apparatus or a content of the image data, or based on the status of the image forming apparatus and the content of the image data. The borderless image forming operation is an operation to form the image over an entire image forming target area on the image formation medium. The bordered image forming operation is an operation to form the image on the image formation medium with a margin formed at a periphery portion of the image forming target area. The method further includes causing the image forming engine to perform the selected one of the borderless image forming operation and the bordered image forming operation.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

A printer 100 (which may be an example of an "image forming apparatus" according to aspects of the present disclosure) in a preferred illustrative embodiment according to aspects of the present disclosure will be described below with reference to FIGS. 1 to 7. In the following description, a vertical direction, a front-to-rear direction, and a left-to-right direction shown in FIG. 1 will be defined as a front-to-rear direction, and a left-to-right direction of the printer 100, respectively. It is noted that hereinafter, each of the above directions may represent two mutually-opposite directions along each individual direction. Specifically, for instance, the vertical direction may represent both the upward direction and the downward direction that are along the vertical direction. Further, the front-to-rear direction may represent both the frontward direction and the rearward direction that are along the front-to-rear direction. Moreover, the left-to-right direction may represent both the leftward direction and the rightward direction that are along the left-to-right direction.

Figure 1:
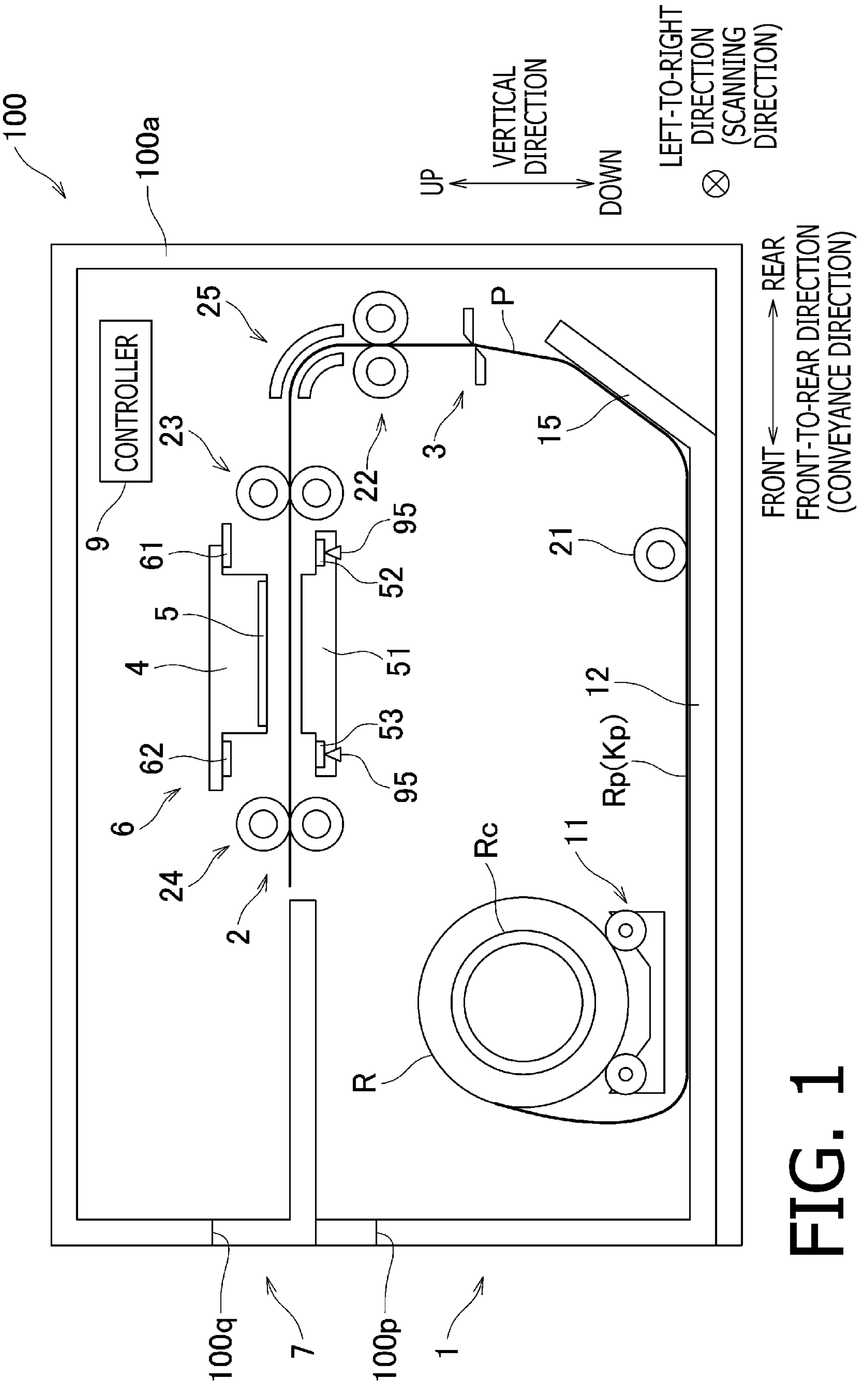
FIG. 1 is a cross-sectional side view schematically showing a configuration of a printer.
Figure 2:
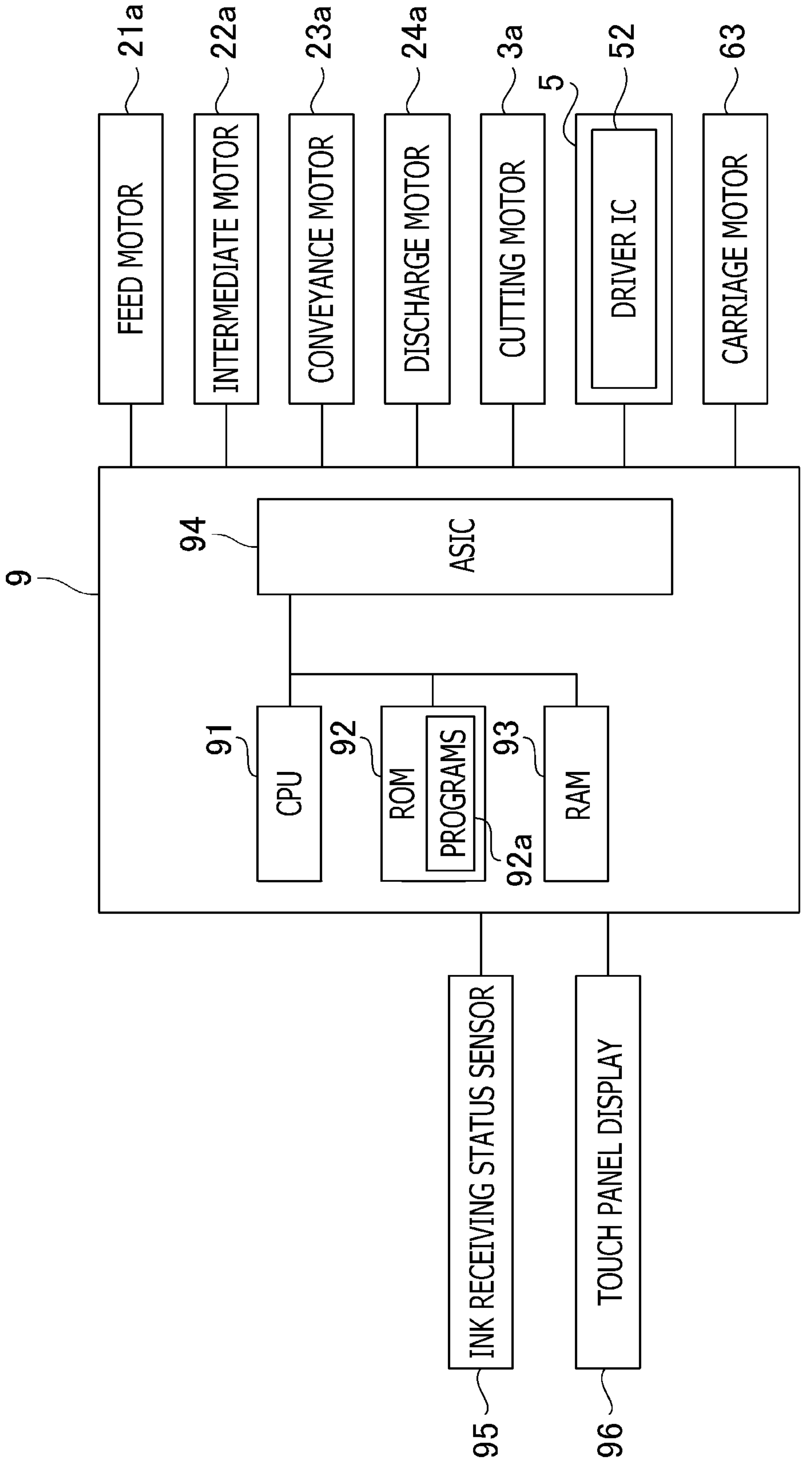
FIG. 2 is a block diagram showing an electrical configuration of the printer.
Figure 3:
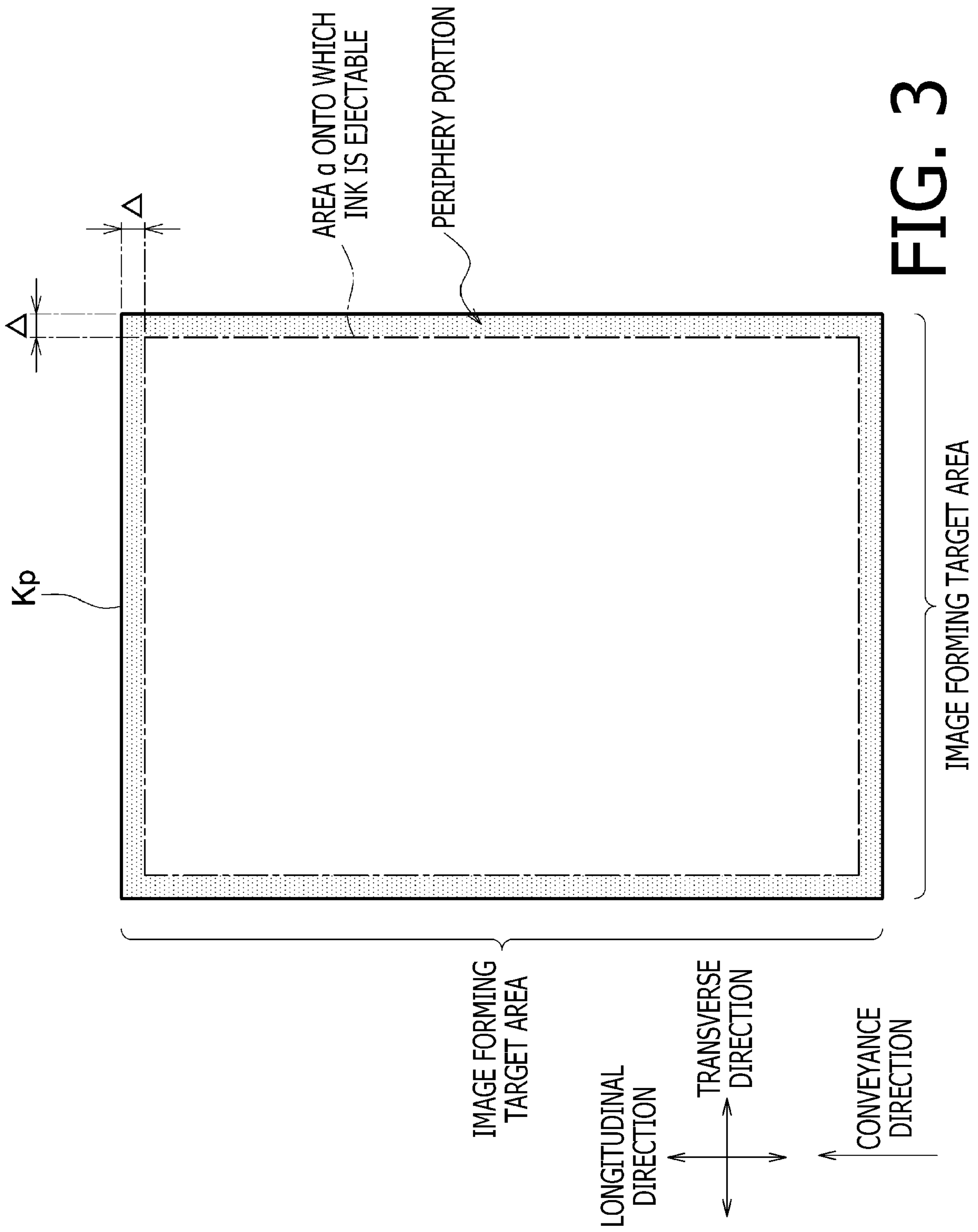
FIG. 3 illustrates bordered printing on a cut sheet used in the printer.
Figure 4:
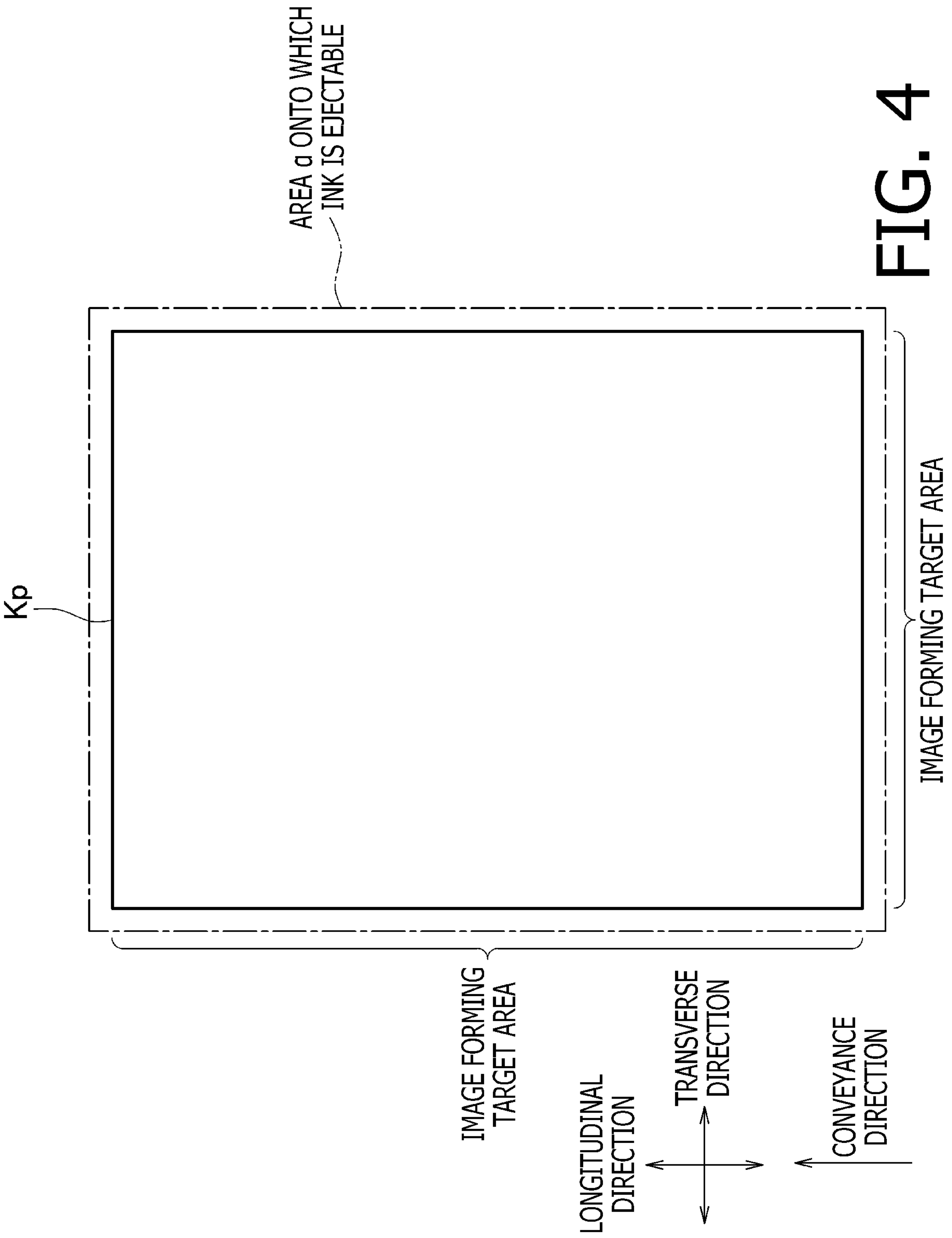
FIG. 4 illustrates borderless printing on the cut sheet used in the printer.
Figure 5:
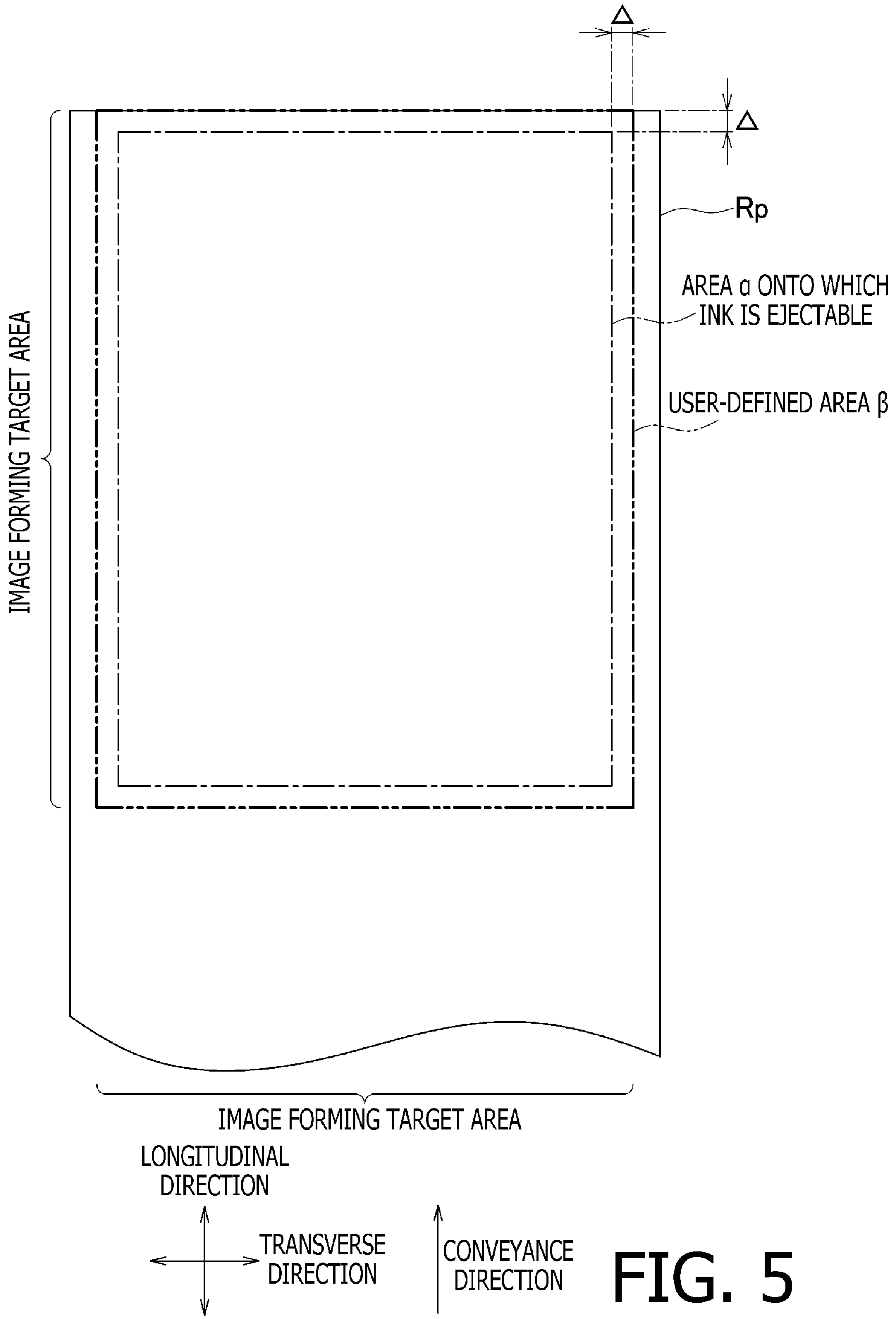
FIG. 5 illustrates bordered printing on a roll sheet used in the printer.
Figure 6:
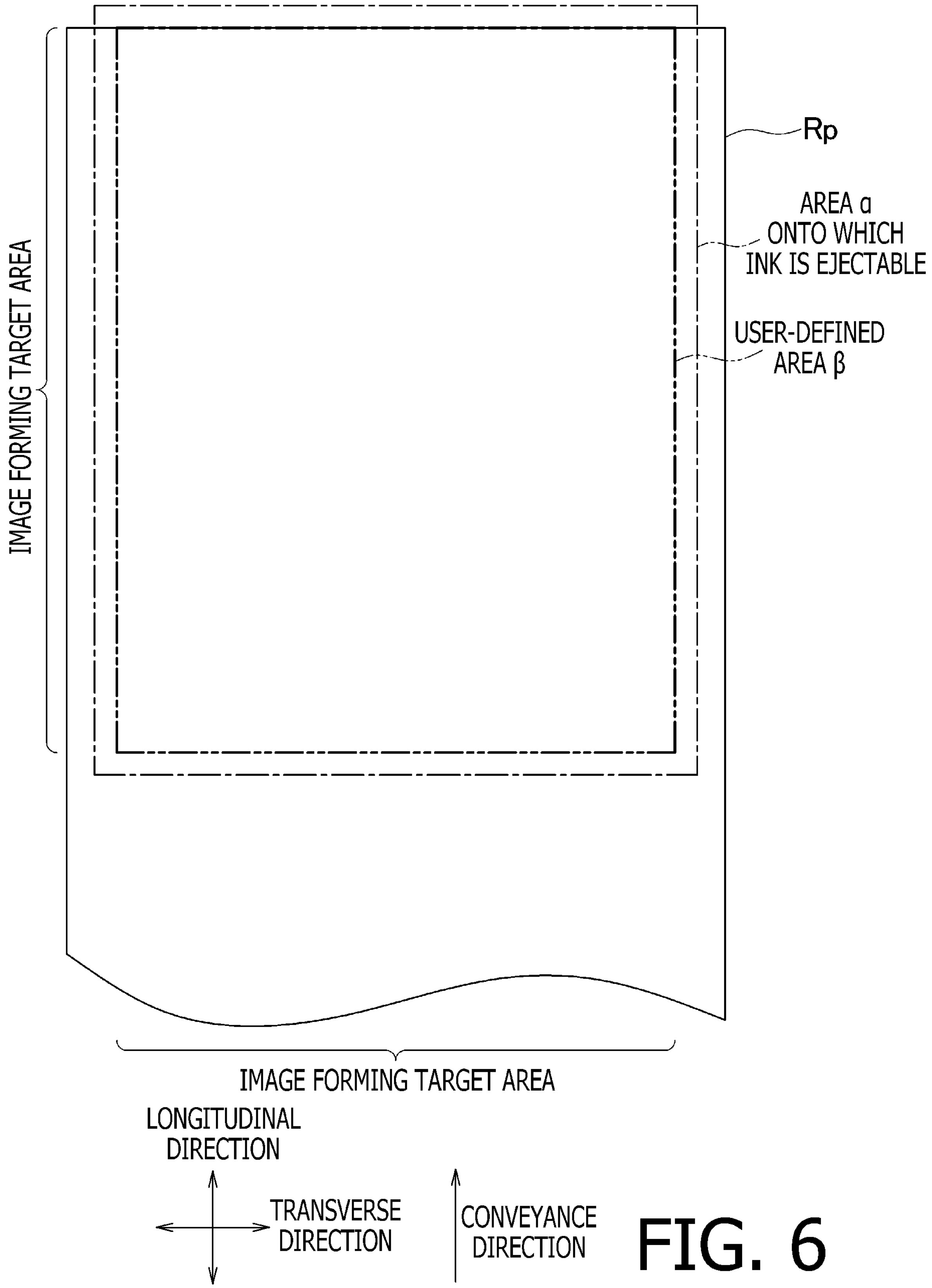
FIG. 6 illustrates borderless printing on the roll sheet used in the printer.

As shown in FIGS. 1 and 2, the printer 100 includes a housing 100*a*, a feed tray 1, a conveyor 2, a cutter 3, a carriage 4, a head 5, a moving mechanism 6, a discharge tray 7 and a controller 9.

The feed tray 1 is disposed below the head 5 in the housing 100*a*. The feed tray 1 is configured to be inserted into and removed from the housing 100*a* along the front-to-rear direction via an opening 10*p* formed in a front wall of the housing 100*a*.

The feed tray 1 accommodates a roll body R and cut sheets Kp. The feed tray 1 may be configured to accommodate both the roll body R and the cut sheets Kp simultaneously or to selectively accommodate either the roll body R or the cut sheets Kp. The feed tray 1 has a roll body supporter 11 configured to support the roll body R, and a placement surface 12 on which the cut sheets Kp are placed thereon.

The roll body R is a long sheet of paper wound in a roll shape around an outer circumference of a cylindrical core member Rc. The cut sheet Kp is a sheet of paper shorter than the long sheet of paper that forms the roll body R. For instance, the cut sheet Kp is a standard-size sheet of A4 or B5. The largest size of the cut sheet Kp usable in the printer 100 is A4 size. The placement surface 12 is configured to support a plurality of cut sheets Kp stacked thereon.

The conveyor 2 is configured to convey a sheet P along a conveyance path (i.e., a path along a thick black line representing the sheet P in FIG. 1) extending from the feed tray 1 to the discharge tray 7 via the head 5. Hereafter, the terms "upstream" and "downstream" shall represent upstream and downstream, respectively, in a conveyance direction in which the sheet P is conveyed along the conveyance path by the conveyor 2. In addition, as directions along the sheet P, a direction parallel to the conveyance direction shall be a longitudinal direction, and a direction orthogonal to the longitudinal direction shall be a transverse direction.

The conveyor 2 includes a pick-up roller 21, intermediate rollers 22, conveyance rollers 23, discharge rollers 24, and a guide 25. These rollers are disposed along the conveyance path in the order of the feed roller 21, the intermediate rollers 22, the conveyance rollers 23, and the discharge rollers 24 from upstream to downstream in the conveyance direction.

The pick-up roller 21 is configured to feed, from the feed tray 1, a roll sheet Rp unwound from the roll body R supported by the roll supporter 11 or a cut sheet Kp placed on the placement surface 12 (more specifically, a cut sheet Kp picked up from the plurality of cut sheets Kp stacked on the placement surface 12). In the following description, when a roll sheet Rp and a cut sheet Kp are not distinguished from each other, they may be referred to as a "sheet P."

The pick-up roller 21 is driven to rotate by a feed motor 21*a* (see FIG. 2). When the feed motor 21*a* is driven by the controller 9, the pick-up roller 21 rotates, thereby applying a feeding force in a direction from the front to the rear to the sheet P in contact with the pick-up roller 21. As a result, the sheet P is fed from the feed tray 1. A rear wall 15 disposed at a rear end of the feed tray 1 is inclined in such a manner that an upper end portion of the rear wall 15 is positioned rearward of a lower end portion of the rear wall 15. Accordingly, the sheet P fed from the feed tray 1 is conveyed obliquely upward.

The intermediate rollers 22 include a driving roller and a driven roller. The driving roller is driven to rotate by a driving force from an intermediate motor 22*a* (see FIG. 2). The driven roller is configured to rotate according to the rotation of the driving roller. When the intermediate motor 22*a* is driven by the controller 9, the intermediate rollers 22 rotate while holding the sheet P therebetween, thereby conveying the sheet P. The intermediate rollers 22 are disposed above a rear end portion of the feed tray 1. The intermediate rollers 22 are configured to convey the sheet P upward while holding the sheet P therebetween that is fed from the feed tray 1 by the pick-up roller 21 and is conveyed obliquely upward. The guide 25 is disposed above the intermediate rollers 22. The guide 25 is configured to guide forward the sheet P that is conveyed upward by the intermediate rollers 22.

The conveyance rollers 23 include a driving roller and a driven roller. The driving roller is driven to rotate by a driving force from a conveyance motor 23*a* (see FIG. 2). The driven roller is configured to rotate according to the rotation of the driving roller. The discharge rollers 24 include a driving roller and a driven roller. The driving roller is driven to rotate by a driving force from a discharge motor 24*a* (see FIG. 2). The driven roller is configured to rotate according to the rotation of the driving roller.

When the conveyance motor 23*a* are driven by the controller 9, the conveyance rollers 23 rotate while holding the sheet P therebetween, thereby conveying the sheet P forward in the conveyance direction. Likewise, when the discharge motor 24*a* are driven by the controller 9, the discharge rollers 24 rotate while holding the sheet P therebetween, thereby conveying the sheet P forward in the conveyance direction. The conveyance rollers 23 are disposed rearward of the head 5. The discharge rollers 24 are disposed in front of the head 5. The conveyance rollers 23 are configured to convey the sheet P guided forward by the guide 25 further forward toward the discharge rollers 24. The discharge rollers 24 are configured to convey the sheet P conveyed forward by the conveyance rollers 23 further forward while holding the sheet P therebetween, thereby discharging the sheet P onto the discharge tray 7.

The cutter 3 is disposed upstream of the intermediate rollers 22 in the conveyance direction, along the conveyance path. Further, the cutter 3 is disposed between the rear end portion of the feed tray 1 and the intermediate rollers 22. For instance, the cutter 3 includes a disk-shaped rotating blade and a driven blade. By a driving force from a cutting motor 3*a* (see FIG. 2), the rotating blade of the cutter 3 is rotated, and the cutter 3 reciprocates along the left-to-right direction. The roll sheet Rp, which has been unwound from the roll body R and conveyed, is cut along the transverse direction of the roll sheet Rp by the cutter 3 when the cutting motor 3*a* is driven by the controller 9. Thereby, a separated part of the roll sheet Rp from the roll body R is discharged onto the discharge tray 7 as a single sheet with a cut end thereof as a trailing end. On the other hand, a cut end of a connected part of the roll sheet Rp with the roll body R becomes a leading end of a sheet to be used for the next image formation.

The head 5 includes a plurality of nozzles formed on a lower surface of the head 5, and a driver IC 52 (see FIG. 2). When the driver IC 52 is driven by the controller 9, ink is ejected from the nozzles and adheres to the sheet P, thereby forming dots. The head 5 is mounted on the carriage 4.

The moving mechanism 6 has two guide rails 61 and 62, and a carriage motor 63 (see FIG. 2). The two guide rails 61 and 62 are spaced apart from each other in the front-to-rear direction. Each of the guide rails 61 and 62 extends along the left-to-right direction. The carriage 4 is disposed to straddle the two guide rails 61 and 62. The carriage 4 is connected with the carriage motor 63, for instance, via a belt (not shown). When the carriage motor 63 is driven by the controller 9, the carriage 4 moves along the guide rails 61 and 62 in a scanning direction (which is along the right-to-left direction). Thereby, the head 5 mounted on the carriage 4 is enabled to move across the sheet P in the scanning direction.

A platen 51 is disposed below the head 5. The platen 51 is a flat plate member configured to support the sheet P that is placed on the platen 51 after conveyed by the conveyor 2. The platen 51 extends to straddle and cover an area onto which ink is ejectable from the head 5 in both the front-to-rear direction and the left-to-right direction. The platen 51 has an absorbing member 53 to absorb ink. The absorbing member 53 is configured to absorb and hold ink that has been ejected from the head 5 to positions outside an area where the sheet P exists. The platen 51 has an ink receiving status sensor 95 to detect a status of the ink held by the absorbing member 53. The ink receiving status sensor 95 is configured to detect whether the absorbing member 53 is holding ink to its limit (platen full error). A result of the detection by the ink receiving status sensor 95 is output to the controller 9.

When the ink, which the head 5 has ejected while reciprocating along the scanning direction in accordance with the movement of the carriage 4, reaches the sheet P, dots are formed in sequence along the scanning direction on the sheet P. Such rows of dots along the scanning direction are formed in sequence as the sheet P is conveyed by the conveyor 2. In any rectangular area within an image forming target area on the sheet P, the dots are lined up in both the scanning direction and the conveyance direction. Thus, an image formed by such arrays of dots appears. For the cut sheet Kp, an entire surface area thereof corresponds to the image forming target area. For the roll sheet Rp, an after-mentioned user-defined area on the surface thereof corresponds to the image forming target area. The head 5 is enabled to eject ink toward the outside of the sheet P in the scanning direction. In such a case, the ink is absorbed by the absorbing member 53 of the platen 51.

The discharge tray 7 is disposed in front of the head 5 and above the feed tray 1 in the housing 100*a*. The discharge tray 7 is configured to be inserted in and removed from the housing 100*a* via an opening 100*q* formed in the front wall of the housing 100*a* along the front-to-rear direction. The sheet P with an image recorded thereon by the head 5 is received on the discharge tray 7.

When the sheet P is the roll sheet Rp, the roll sheet Rp itself as discharged onto the discharge tray 7 is a user-desired final printed material, or an appropriately-sized sheet cut out by the user from the roll sheet Rp is a final printed material. The cutting by the user is mainly made along the longitudinal direction (i.e., the direction corresponding to the conveyance direction of the roll sheet Rq) of the discharged roll sheet Rp, as will be described later. Hereinafter, the printed material finally obtained as above may be referred to as the "final printed material."

A cartridge holder is disposed in the housing 100A. The cartridge holder is configured to hold four ink cartridges removably attached thereto, each of which stores ink of a corresponding one of the four colors (i.e., black, yellow, cyan, and magenta). Ink is supplied to the head 5 from each of the ink cartridges attached to the cartridge holder, for instance, via a tube.

A touch panel display 96 is disposed on an outside front face of the housing 100*a*. The touch panel display 96 is configured to display various types of information such as characters and images on its screen under control by the controller 9. The touch panel display 96 is further configured to, in response to an indicator (e.g., a finger or a stylus) coming into contact with the screen, detect the contact position and send the detection result to the controller 9.

The controller 9 is configured to take overall control of the printer 100. As shown in FIG. 2, the controller 9 is electrically connected with the feed motor 21*a*, the intermediate motor 22*a*, the conveyance motor 23*a*, the discharge motor 24*a*, the cutting motor 3*a*, the driver IC 52, the carriage motor 63, and the ink receiving status sensor 95.

As shown in FIG. 2, the controller 9 includes a CPU ("CPU" is an abbreviation for "Central Processing Unit") 91, a ROM ("ROM" is an abbreviation for "Read Only Memory") 92, a RAM ("RAM" is an abbreviation for "Random Access Memory") 93, and an ASIC ("ASIC" is an abbreviation for "Application Specific Integrated Circuit") 94. The ROM 92 stores programs 92*a*, which include programs executable by the CPU 91 and programs executable by the ASIC 94. Further, the ROM 92 stores data indicating setting information input in an after-mentioned information input process. The RAM 93 is configured to temporarily store data necessary for the CPU 91 or the ASIC 94 to execute programs. The temporarily stored data includes image data received from external devices such as PCs, and image data read from recording media. The image data contains data that explicitly indicates which of bordered printing and borderless printing is to be performed, data that indicates a user-defined size when the roll sheet Rp is used, and data that indicates an image to be formed on the sheet P. However, in the illustrative embodiment, the data that explicitly indicates which of the bordered printing and the borderless printing is to be performed may or may not be included in the image data. The bordered printing and the borderless printing will be described later. The user-defined size indicates actual dimensions (e.g., 200 mm×200 mm) of user-desired type of sheet in the longitudinal direction and the transverse direction vertical and horizontal directions when the roll sheet Rp is used.

The controller 9 may be configured in such a manner that only the CPU 91 performs various processes, that the ASIC 94 performs various processes, or that the CPU 91 and the ASIC 94 perform various processes in cooperation with each other. The controller 9 may have a single CPU 91 configured to perform processing alone, or may have a plurality of CPUs 91 configured to share the processing. The controller 9 may have a single ASIC 94 configured to perform processing alone, or may have a plurality of ASICs 94 configured to share the processing.

The controller 9 mainly performs an information input process to allow the user to input various types of setting information, and an image forming process to form an image on the sheet P.

In the information input process, the controller 9 allows the user to input which the user selects from the two types of printing (i.e., the bordered printing and the borderless printing). In this process, the controller 9 causes the touch panel display 96 to display a screen containing text and images for prompting the user to input information, and the user is allowed to make a selection between the bordered printing and the borderless printing based on a position where the user has brought an indicator (e.g., his finger or a stylus) into contact with the touch panel display 96. The result of the selection is stored as setting information in the ROM 92 by the controller 9. Until such information is first input, the ROM 92 does not store any setting information indicating which of the bordered printing and the borderless printing is to be performed.

In the image forming process, the controller 9 controls the conveyor 2, the cutter 3, and the head 5 as follows. Based on the image data stored in the RAM 93, the controller 9 alternately and repeatedly performs a sheet conveying operation and an image forming operation. In the sheet conveying operation, the controller 9 causes the conveyor 2 to convey the sheet P by a particular distance along the conveyance path. In the image forming operation, the controller 9 causes the head 5 to eject ink onto the sheet P from the plurality of nozzles while causing the moving mechanism 6 to reciprocate the carriage 4 along the scanning direction. Thereby, the controller 9 performs image formation by either the bordered printing or the borderless printing.

The borderless printing is a method to form an image over the entire image forming target area. In the illustrative embodiment, the controller 9 causes, in the borderless printing, the head 5 to eject ink onto an area that straddles and covers the image forming target area in both the longitudinal direction and the transverse direction. This makes it difficult for a blank space to be formed at a periphery portion of the image forming target area of the sheet P and makes it easy for an image to be surely formed over the entire image forming target area. On the other hand, in the borderless printing, ink may be ejected onto the outside of the sheet P. If ink is ejected onto the outside of the sheet P, the ink is absorbed by the absorbing member 53 of the platen 51. In the bordered printing, the controller 9 causes the head 9 to eject ink onto an area inside (and surrounded by) the periphery portion of the image forming target area. Namely, the bordered printing is a method to perform image formation while securing, at the periphery portion of the image forming target area, a margin where no image is formed. According to the bordered printing, it is difficult for ink to be ejected onto the outside of the sheet P.

For instance, when the sheet P is the cut sheet Kp, the image forming target area is set to an entire surface area of the cut sheet Kp. Then, as indicated by an alternate long and short dash line in FIG. 3, an area a onto which ink is ejectable in the bordered printing is set to an area inside (and surrounded by) a margin A that is secured at the periphery portion of the image forming target area. Thereby, an image is allowed to be formed in the area a of the cut sheet Kp. In the illustrative embodiment, the periphery portion, of the sheet P or the image, shall refer to a strip-shaped section (see a hatched area in FIG. 3) extending along the entire four outer edges of the sheet P or the image. Further, as indicated by an alternate long and short dash line in FIG. 4, the area a onto which ink is ejectable in the borderless printing is set to an area that straddles and covers the image forming target area in both the longitudinal direction and the transverse direction. Thereby, an image is allowed to be formed over the entire image forming target area. The cut sheet Kp with the image formed thereon in the bordered printing or the borderless printing is discharged onto the discharge tray 7 as an image-formed sheet.

When the sheet P is the roll sheet Rp, the image forming target area is set to a user-defined area β. The user-defined area β is an area with a user-defined size on the roll sheet Rp. As indicated by an alternate long and short dash line in FIG. 5, the area a onto which ink is ejectable in the bordered printing is set to an area inside (and surrounded by) a margin A that is secured at the periphery portion of the image forming target area. Thereby, an image is allowed to be formed in the area a of the roll sheet Rp. As indicated by an alternate long and short dash line in FIG. 6, the area a onto which ink is ejectable in the borderless printing is set to an area that straddles and covers the image forming target area in both the longitudinal direction and the transverse direction. Thereby, an image is allowed to be formed over the entire image forming target area. The roll sheet Rp with the image formed thereon in the bordered printing or the borderless printing is cut at an upstream end of the user-defined area ß in the longitudinal direction by a cutting operation with the cutter 3 under control by the controller 9. Thus, each single sheet cut out from the roll sheet Rp by the cutting operation with the cutter 3 is discharged onto the discharge tray 7 as an image-formed sheet with the user-defined size in the longitudinal direction.

In the meantime, as described above, in the illustrative embodiment, the image data may not contain data that explicitly indicates which of the bordered printing and the borderless printing is to be performed. If the printer 100 is configured to uniformly perform image formation by the borderless printing or uniformly perform image formation by the bordered printing when the image data does not contain data that explicitly indicates which of the bordered printing and the borderless printing is to be performed, there may be a risk of frequently occurring cases in which an image unintended by the user has been formed.

Therefore, the controller 9 in the illustrative embodiment is configured to select either the bordered printing or the borderless printing based on a status of the printer 100 and contents of the image data when the image data does not contain data that explicitly indicates which of the bordered printing and the borderless printing is to be performed. For instance, the status of the printer 100 includes contents of the setting information stored in the ROM 92. Further, for instance, the contents of the image data include contents of the data indicating the user-defined size and the image. The controller 9 may be configured to, when the image data does not contain data that explicitly indicates which of the bordered printing and the borderless printing is to be performed, select one of the bordered printing and the borderless printing, based on the status of the printer 100 or a content of the image data, or based on the status of the printer 100 and the content of the image data. The controller 9 selects either the bordered printing or the borderless printing based on information such as the above information that suggests the user's intention.

Figure 7A:
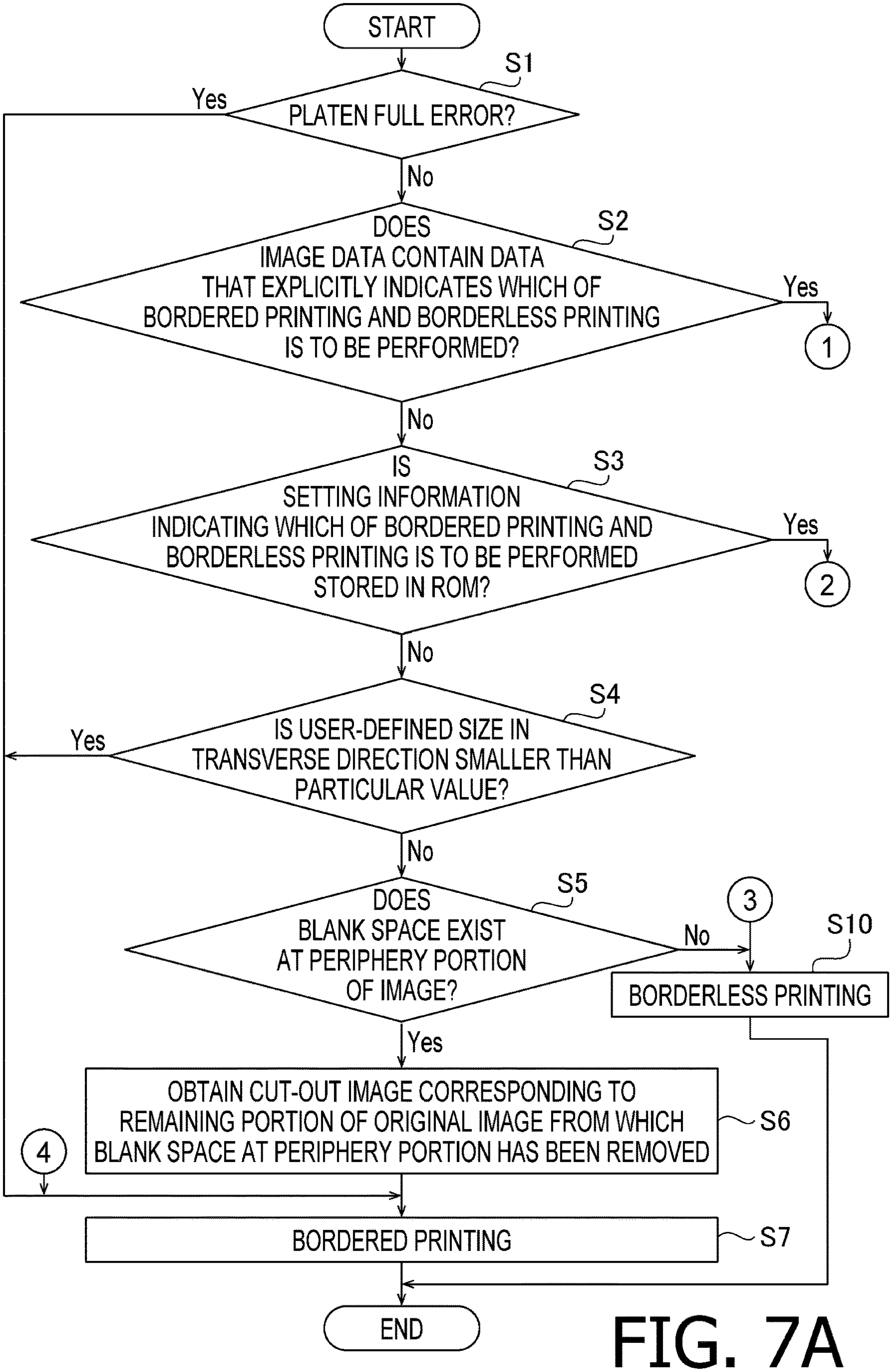
FIGS. 7A and 7B are flowcharts showing a procedure of a process to be performed by a controller of the printer.
Figure 7B:
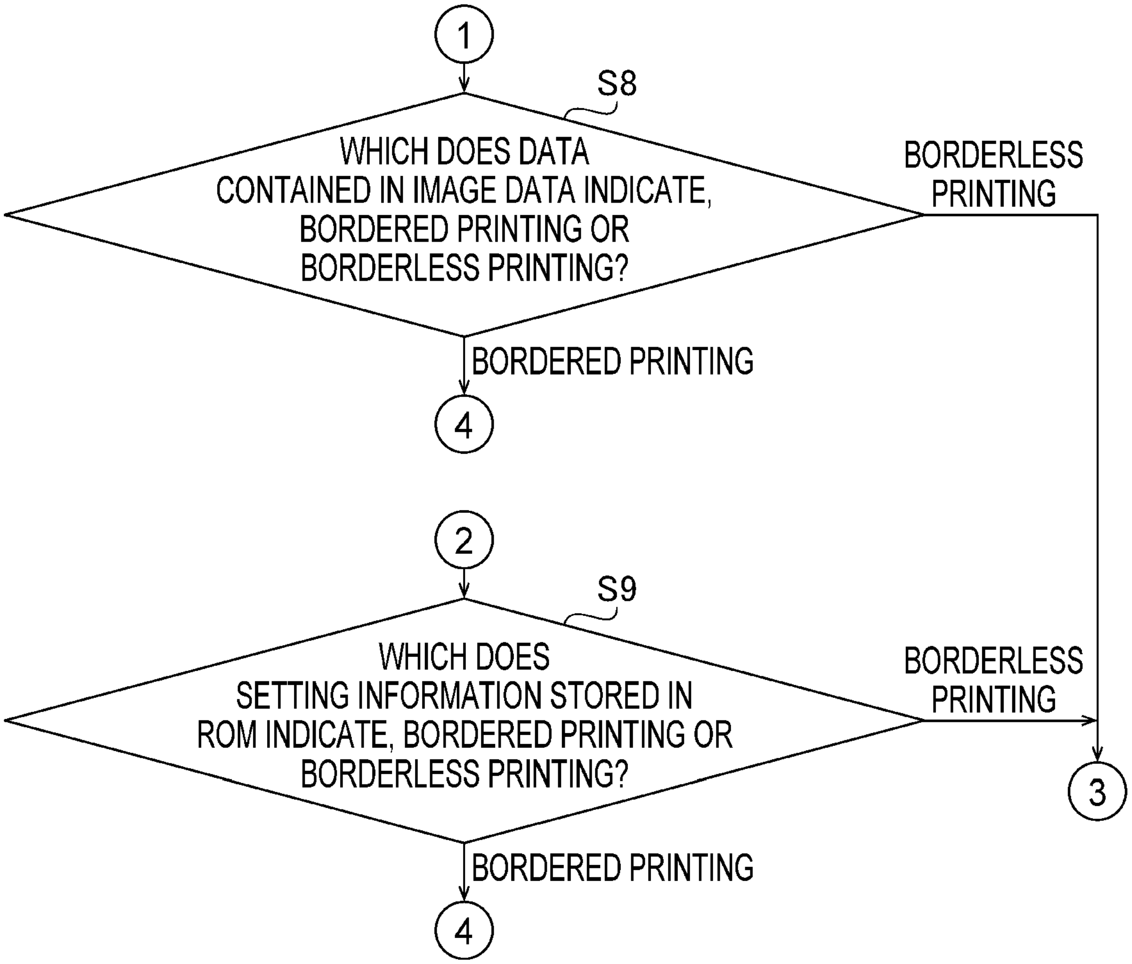

Specifically, the controller 9 performs a process shown in FIGS. 7A and 7B. It is noted that the controller 9 may be configured to perform the process shown in FIGS. 7A and 7B when the CPU 91 and/or the ASIC 94 execute programs 92*a* stored in the ROM 92. The process shown in FIGS. 7A and 7B is performed when the roll sheet Rp is used as the sheet P. First, based on the result of the detection by the ink receiving status sensor 95, the controller 9 determines whether the absorbing member 53 is holding ink to its limit, i.e., whether the absorbing member 53 is in the state of platen full error (S1). In response to determining that the absorbing member 53 is in the state of platen full error (S1: Yes), the controller 9 selects the bordered printing (S7). This is because if the borderless printing is performed in the state of platen full error, the ink that the absorbing member 53 of the platen 51 is unable to receive may overflow and contaminate the inside of the printer 100. In the bordered printing, the controller 9 performs image formation in such a manner that the entire image represented by the image data is formed over the entire area a shown in FIG. 5.

On the other hand, in response to determining that the absorbing member 53 is not in the state of platen full error (S1: No), the controller 9 determines whether the image data contains data that explicitly indicates which of the bordered printing and the borderless printing is to be performed (S2). For instance, the determination in S2 is made by determining, when a character string indicating that the borderless printing is on or off is set as an image data format, whether the image data contains data indicating the character string. In response to determining that the image data contains data that explicitly indicates which of the bordered printing and the borderless printing is to be performed (S2: Yes), the controller 9 determines whether the data contained in the image data indicates the bordered printing or the borderless printing (S8). In response to determining that the data contained in the image data indicates the bordered printing (S8: Bordered Printing), the controller 9 proceeds to S7 to perform the bordered printing. Meanwhile, in response to determining that the data contained in the image data indicates the borderless printing (S8: Borderless Printing), the controller 9 proceeds to S10 to perform the borderless printing. In the bordered printing, the controller 9 performs image formation in such a manner that the entire image represented by the image data is formed over the entire area a shown in FIG. 5. In the borderless printing, the controller 9 performs image formation in such a manner that ink ejection for forming the entire image represented by the image data is performed over the entire area a shown in FIG. 6 (the same applies the following borderless printing).

In response to determining that the image data does not contain data that explicitly indicates which of the bordered printing and the borderless printing is to be performed (S2: No), the controller 9 determines whether setting information indicating which of the bordered printing and the borderless printing is to be performed is stored in the ROM 92 (S3). In response to determining that setting information indicating which of the bordered printing and the borderless printing is to be performed is stored in the ROM 92 (S3: Yes), the controller 9 determines whether the setting information stored in the ROM 92 indicates the bordered printing or the borderless printing (S9). In response to determining that the setting information stored in the ROM 92 indicates the bordered printing (S9: Bordered Printing), the controller 9 proceeds to S7 to perform the bordered printing. Meanwhile, in response to determining that the setting information stored in the ROM 92 indicates the borderless printing (S9: Borderless Printing), the controller 9 proceeds to S10 to perform the borderless printing.

Figure 8:
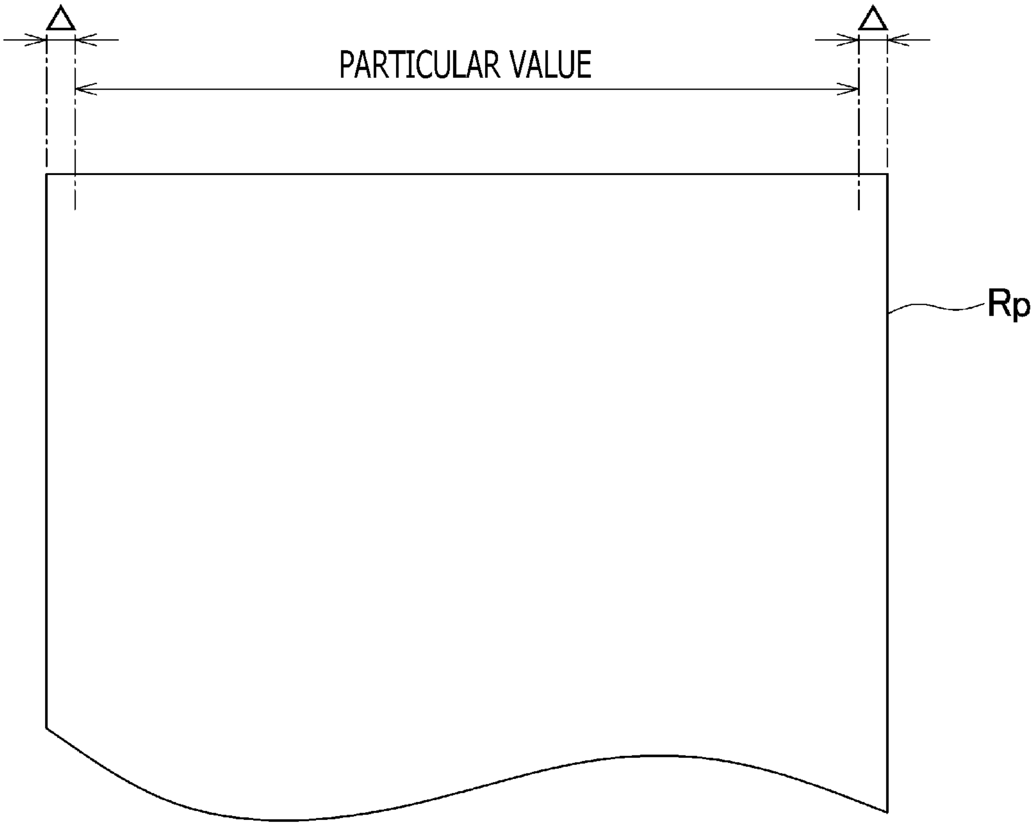
FIG. 8 shows a particular value used in the process shown in FIGS. 7A and 7B for selecting either bordered printing or borderless printing.

In response to determining that setting information indicating which of the bordered printing and the borderless printing is to be performed is not stored in the ROM 92 (S3: No), the controller 9 determines whether the user-defined size in the transverse direction that is indicated by the image data is smaller than a particular value (S4). As shown in FIG. 8, the particular value is set to a value obtained by subtracting a double value of the size of the margin A from a length of the roll sheet Rp in the transverse direction. In response to determining that the user-defined size in the transverse direction is smaller than the particular value (S4: Yes), the controller 9 selects the bordered printing. In the bordered printing, the controller 9 performs image formation in such a manner that the entire image represented by the image data is formed over the entire area a shown in FIG. 5.

Figure 9:
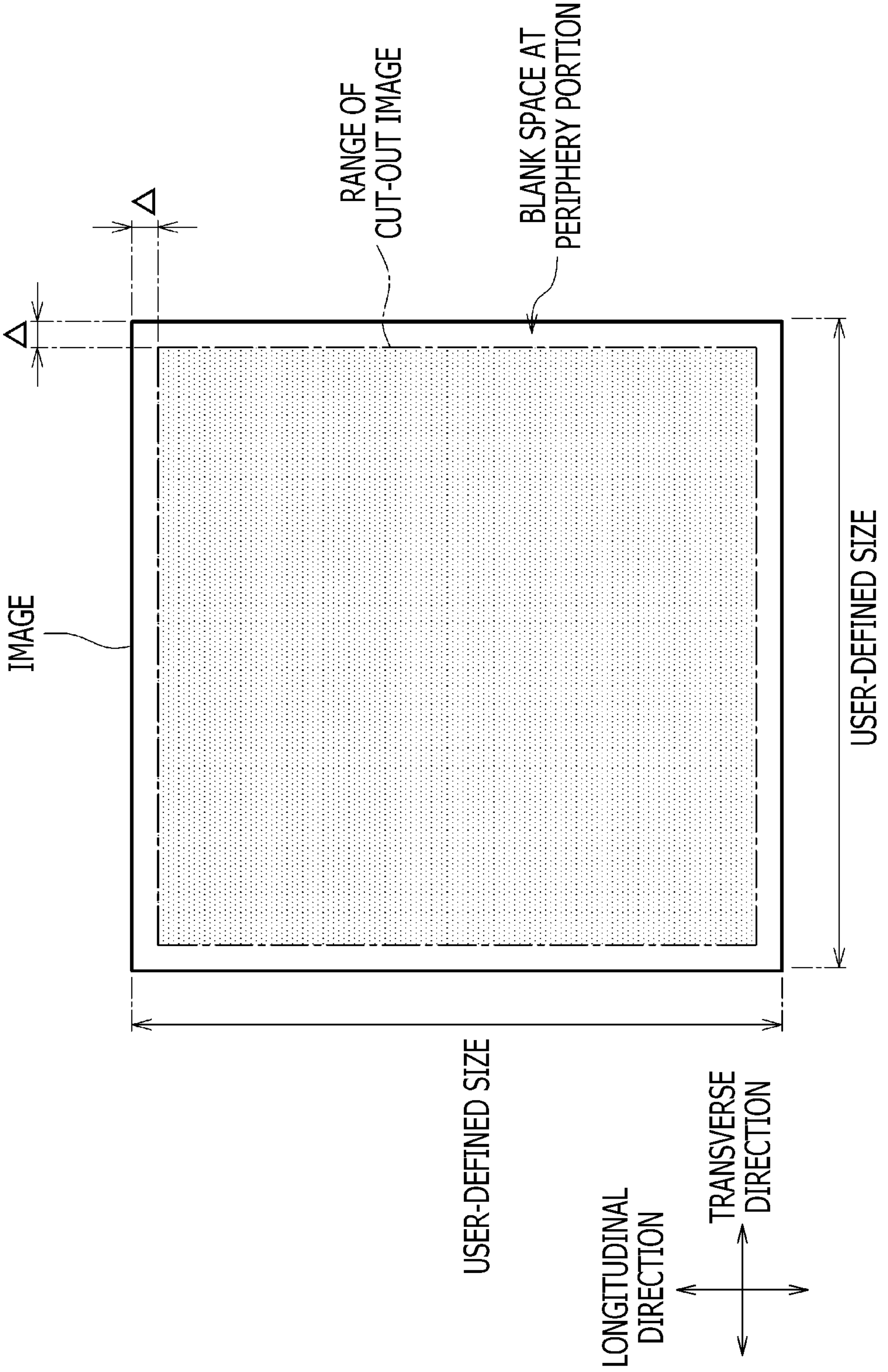
FIG. 9 shows a range of a cut-out image obtained in the process shown in FIGS. 7A and 7B.

In response to determining in S4 that the user-defined size in the transverse direction is equal to or greater than the particular value (S4: No), the controller 9 determines whether a blank space corresponding to the margin A in FIG. 5 exists at a periphery portion of the image represented by the image data (S5). Specifically, the controller 9 determines whether a strip-shaped blank space, as shown in FIG. 9, extending along the entire four outer edges of the image exists at the periphery portion of the image. In response to determining that a blank space corresponding to the margin A in FIG. 5 exists at the periphery portion of the image represented by the image data (S5: Yes), the controller 9 obtains a cut-out image (see FIG. 9) corresponding to a remaining portion of the original image from which the blank space at the periphery portion has been removed (S6). Thereafter, the controller 9 selects the bordered printing (S7). In the bordered printing, the controller 9 performs image formation based on the cut-out image obtained in S6. Namely, in the bordered printing, the controller 9 performs image formation in such a manner that the entire cut-out image is formed over the entire area a shown in FIG. 5. In response to determining that a blank space corresponding to the margin A in FIG. 5 does not exist at the periphery portion of the image represented by the image data (S5: No), the controller 9 selects the borderless printing (S10).

According to the illustrative embodiment described above, even when the image data does not contain data that explicitly indicates which of the bordered printing and the borderless printing is to be performed, the controller 9 selects either the bordered printing or the borderless printing based on the status of the printer 100 and the contents of the image data, without uniformly selecting a particular one of the bordered printing and the borderless printing (see S2 to S10 in FIGS. 7A and 7B). The user's intention may be suggested depending on the status of the printer 100. Specifically, for instance, the user's intention is suggested when the setting information that indicates which of the bordered printing and the borderless printing is to be performed is stored in the ROM 92. Further, it may be suggested whether the user intends to cause the printer 100 to perform the bordered printing or the borderless printing, depending on the contents of the image data. Specifically, for instance, it is suggested that the user intends to cause the printer 100 to perform the bordered printing, when the image represented by the image data contains a blank space (see FIG. 9). Thus, as the controller 9 selects either the bordered printing or the borderless printing based on the status of the printer 100 and the contents of the image data, it is likely that the controller 9 performs image formation according to the user's intention.

In the illustrative embodiment, as a selection between the bordered printing and the borderless printing based on the contents of the image data, the controller 9 makes the selection based on the user-defined size (see S7 after S4: Yes in FIG. 7A). The user-defined size may suggest the user's intention. For instance, if the user-defined size is smaller than the aforementioned particular value, the user may intend to cause the printer 100 to perform image formation in such a manner that a margin is formed around the image. In particular, when the user-defined size is smaller than but close to the particular value, there is a relatively high possibility that the user desires the bordered printing to form a margin around the image. Thus, as the controller 9 selects the bordered printing based on the user-defined size, it is likely that the controller 9 performs image formation according to the user's intention.

Further, in the illustrative embodiment, the controller 9 selects either the bordered printing or the borderless printing based at least on a status of a range of the blank space included in the periphery portion of the image represented by the image data. Specifically, when the user-defined size in the transverse direction is equal to or greater than the particular value (S4: No in FIG. 7A), and a blank space corresponding to the margin A in FIG. 5 exists at the periphery portion of the image represented by the image data (S5: Yes), the controller 9 selects the bordered printing (S7). Thus, depending on the blank space existing at the periphery portion of the image, the user may intend to cause the printer 100 to perform the bordered printing. In particular, when the user-defined size in the transverse direction is close to the width of the roll sheet Rp, and a blank space corresponding to the margin A exists at the periphery portion of the image, there is a relatively high possibility that the user intends to cause the printer 100 to perform the bordered printing. Thus, as the controller 9 selects the bordered printing based on the status of the range of the blank space, it is likely that the controller 9 performs image formation according to the user's intention.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the present disclosure are provided below.

Modifications

In the aforementioned illustrative embodiment, as shown in FIG. 7A, the determination steps of S3, S4, and S5 are executed in this order, and the controller 9 makes a selection between the bordered printing and the borderless printing based on the determination results in the individual steps. Specifically, in S3, the controller 9 determines whether the setting information indicating which of the bordered printing and the borderless printing is to be performed is stored in the ROM 92. Further, in S4, the controller 9 determines whether the user-defined size in the transverse direction that is indicated by the image data is smaller than the particular value. Moreover, in S5, the controller 9 determines whether a blank space corresponding to the margin A in FIG. 5 exists at the periphery portion of the image represented by the image data. However, the order of the determination steps may be changed. For instance, the controller 9 may make the determination in S3 after the negative determination in S5 (S5: No) following the negative determination in S4 (S4: No).

In the aforementioned illustrative embodiment, the controller 9 performs the process shown in FIGS. 7A and 7B when the roll sheet Rp is used as the sheet P. In a modification according to aspects of the present disclosure, the controller 9 may also perform substantially the same process as shown in FIGS. 7A and 7B when the image data does not contain data that explicitly indicates which of the bordered printing and the borderless printing is to be performed although the cut sheet Kp is used as the sheet P. For instance, the controller 9 may select either the bordered printing or the borderless printing, based on the setting information stored in the ROM 92 and/or based on the status of the range of the blank space included in the periphery portion of the image represented by the image data.

In the aforementioned illustrative embodiment, aspects of the present disclosure have been applied to the inkjet printer 100. However, practicable examples to which aspects of the present disclosure are applicable are not limited thereto. Aspects of the present disclosure may be applied to a system having another inkjet-type image forming apparatus (e.g., a multi-function peripheral or a copy machine) configured to eject ink from a head. Further, aspects of the present disclosure may be applied to a system having a laser-type image forming apparatus configured to perform an image recording process by transferring toner onto a printing sheet instead of ejecting ink onto the printing sheet in the inkjet method. In this case, a toner cartridge containing toner may be removably attached to the image forming apparatus.

The following shows examples of associations between elements illustrated in the aforementioned illustrative embodiment(s) and modification(s), and elements claimed according to aspects of the present disclosure. For instance, the printer 100 may be an example of an "image forming apparatus" according to aspects of the present disclosure. The head 5 may be included in an "image forming engine" according to aspects of the present disclosure. Further, the carriage 4 and the moving mechanism 6 may be included in the "image forming engine" according to aspects of the present disclosure. The controller 9 may be an example of a "controller" according to aspects of the present disclosure. The feed tray 1 may be an example of a "sheet medium storage" according to aspects of the present disclosure. The conveyor 2 may be an example of a "conveyor" according to aspects of the present disclosure. The cutter 3 may be an example of a "cutter" according to aspects of the present disclosure. The ROM 92 may be an example of a "memory" according to aspects of the present disclosure. The ROM 92 may be an example of a "non-transitory computer-readable storage medium" according to aspects of the present disclosure. The programs 92*a* may be an example of "computer-readable instructions" according to aspects of the present disclosure. The CPU 91 and the ASIC 94 may be included in examples of a "processor" according to aspects of the present disclosure. An "image forming target area" according to aspects of the present disclosure may be an area of an entire surface of an image formation medium, or may be a partial area of the surface of the image formation medium. For instance, the former may be an area set for a standard-size sheet of A4 or B5. For instance, the latter may be an area set for roll paper of a long sheet of paper wound in a roll shape. As a more specific example in a case where the roll paper is used, a user-defined size area set for the roll paper may correspond to the "image forming target area" according to aspects of the present disclosure.

What is claimed is:

1. An image forming apparatus comprising:

an image forming engine configured to form on an image formation medium an image represented by image data externally obtained, by a borderless image forming operation or a bordered image forming operation, wherein the borderless image forming operation is an operation to form the image over an entire image forming target area on the image formation medium, the bordered image forming operation is an operation to form the image on the image formation medium with a margin formed at a periphery portion of the image forming target area, and the image data contains size indicating data that indicates a size of the image forming target area in each of a first direction and a second direction orthogonal to the first direction on the image formation medium;

a sheet medium storage configured to accommodate a roll body of a long sheet medium wound in a roll shape;

a conveyor configured to convey the sheet medium from the sheet medium storage to the image forming engine along the second direction;

a cutter configured to cut, along the first direction, the sheet medium with the image formed thereon by the image forming engine; and a controller configured to:

when the image data does not contain data that explicitly indicates which of the borderless image forming operation and the bordered image forming operation is to be performed, select one of the borderless image forming operation and the bordered image forming operation, based on a status of the image forming apparatus or a content of the image data, or based on the status of the image forming apparatus and the content of the image data;

cause the image forming engine to perform the selected one of the borderless image forming operation and the bordered image forming operation;

control the cutter to cut the sheet medium in such a manner that a length of a sheet medium cut out from the long sheet medium is the size in the second direction that is indicated by the size indicating data; and select one of the borderless image forming operation and the bordered image forming operation, based at least on the size of the image forming target area in the first direction that is indicated by the size indicating data.

2. The image forming apparatus according to claim 1, further comprising a memory configured to store setting information that indicates which of the borderless image forming operation and the bordered image forming operation is to be performed, wherein the controller is further configured to select one of the borderless image forming operation and the bordered image forming operation, based at least on which, of the borderless image forming operation and the bordered image forming operation, is indicated by the setting information as the status of the image forming apparatus.

3. The image forming apparatus according to claim 1, wherein the controller is further configured to select the bordered image forming operation when the size of the image forming target area in the first direction that is indicated by the size indicating data is smaller than a particular value.

4. The image forming apparatus according to claim 1, wherein the controller is further configured to select one of the borderless image forming operation and the bordered image forming operation, based at least on a status of a range of a blank space included in a periphery portion of the image forming target area represented by the image data.

5. The image forming apparatus according to claim 4, wherein the controller is further configured to select the bordered image forming operation when the size of the image forming target area in the first direction that is indicated by the size indicating data is equal to or greater than a particular value and when the range of the blank space included in the periphery portion of the image represented by the image data is equal to or greater than a predetermined value.

6. The image forming apparatus according to claim 1, wherein the borderless image forming operation is image formation to be performed over an area that straddles and covers the image forming target area.

* * * * *